US009126440B1

(12) United States Patent
Lotz et al.

(10) Patent No.: US 9,126,440 B1
(45) Date of Patent: Sep. 8, 2015

(54) PARTITIONED HANDLING OF DOCUMENTS PRINTED IN AN N-UP FORMAT

(71) Applicants: Michael Lotz, Longmont, CO (US); David Stokes, Longmont, CO (US); Adam Swartz, Thornton, CO (US)

(72) Inventors: Michael Lotz, Longmont, CO (US); David Stokes, Longmont, CO (US); Adam Swartz, Thornton, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/267,059

(22) Filed: May 1, 2014

(51) Int. Cl.
*B41J 2/00* (2006.01)
*B41J 11/46* (2006.01)
*B41J 11/68* (2006.01)
*B41J 11/66* (2006.01)

(52) U.S. Cl.
CPC ...................................... *B41J 11/663* (2013.01)

(58) Field of Classification Search
USPC .......................................................... 347/110
See application file for complete search history.

(56) References Cited

U.S. PATENT DOCUMENTS

| 7,016,068 | B1 | 3/2006 | Gnocato et al. |
| 7,099,037 | B2 | 8/2006 | Clark et al. |
| 7,690,634 | B2 | 4/2010 | Morales |
| 8,274,693 | B2 | 9/2012 | Oshima |
| 2008/0024820 | A1* | 1/2008 | Ohtomo ....................... 358/1.15 |
| 2010/0201066 | A1* | 8/2010 | Dawley .......................... 271/279 |
| 2010/0206192 | A1 | 8/2010 | Rancourt et al. |
| 2011/0149314 | A1 | 6/2011 | Kim |
| 2011/0234720 | A1* | 9/2011 | Valenti et al. ................. 347/101 |
| 2012/0019866 | A1 | 1/2012 | Kuroshima |

OTHER PUBLICATIONS

HP T400 color inkjet web press family. Hewlett Packard (2012). Retrieved from http://www.hp.com/hpinfo/newsroom/press_kits/2012/HPdrupa12/HP_T410.pdf.
Ultimate lean print manufacturing, Pitney Bowes® IntelliJet™ 42 printing system. Pitney Bowes (2012). Retrieved from http://www.pb.com/docs/US/Products-Services/Equipment/Envelope-Document-Printers/Document-Printers/Intellijet/pdf/IntelliJet42-Brochure-March-2012.pdf.

* cited by examiner

*Primary Examiner* — Stephen Meier
*Assistant Examiner* — Alexander D Shenderov
(74) *Attorney, Agent, or Firm* — Duft Bornsen & Fettig LLP

(57) ABSTRACT

Systems and methods for an Automated Document Factory (ADF) system configured to print a web in a 4-up format and to handle the web with 2-up post-print equipment. One embodiment is an apparatus that includes a post-print system. The post-print system receives a web of media printed in an N-up format where N is three or more. The post-print system includes a cutting unit that cuts the web along a length to form segments. A first segment includes documents printed in a 2-up format. The post-print system also includes a 2-up handler that receives the first segment, reads an instruction printed on the first segment that includes handling information for the documents printed on the first segment, and processes the documents printed on the first segment based on the handling information.

17 Claims, 5 Drawing Sheets

PARTITIONED HANDLING OF DOCUMENTS PRINTED IN AN N-UP FORMAT

FIELD OF THE INVENTION

The invention relates to processing print jobs in an Automated Document Factory (ADF) system.

BACKGROUND

An Automated Document Factory (ADF) is configured to handle the production and organization of documents on a large scale. For example, in addition to receiving and processing large print jobs (e.g., hundreds or thousands of documents) from a plurality of clients for printing on high-speed printers, an ADF may include a number of modules that perform post-print handling such as inserting and mailing of the documents. Because of this enhanced functionality, ADF systems are useful for numerous high-volume printing applications such as mass-mail printing of time sensitive statements and bills.

A high-speed printer may include functionality to print multiple pages across the width of a continuous-form web, which is commonly referred to as N-up printing. The N in N-up printing refers to the number of pages printed across a width of one side of a web. For example, in 2-up printing, a printer prints two pages across the width of the web, 3-up printing prints three pages across the width, 4-up printing prints four pages across the width, and so on. N-up printing can reduce costs associated with printing, particularly when a wide web (e.g., thirty inches across or more) is used, since it allows a single printer to produce pages at a faster rate.

However, N-up printing is limited in current ADF systems because post-print devices, such as inserter machines, are incapable of handling a web that is anything over 2-up. As such, current ADF systems are unable to benefit from the cost savings of 3-up or 4-up printing since downstream post-print systems are unable to process webs that are in a 3-up or 4-up format.

SUMMARY

Embodiments herein provide for processing print jobs in an Automated Document Factory (ADF) system. More specifically, these embodiments provide an ADF system configured to print a web in a 4-up format and to handle the web with 2-up post-print equipment. The ADF system organizes the documents in a single print job for 4-up printing such that the web may, at a later time, be split into segments which are dispatched separately to post-print devices capable of handling documents in a 2-up format. This allows the print job to print with the efficiency benefits of 3-up or 4-up printing while retaining compatibility with 2-up downstream modules in the ADF system.

One embodiment is an apparatus that includes a post-print system. The post-print system is configured to receive a web of media printed in an N-up format where N is at least three. The post-print system includes a cutting unit configured to cut the web along a length of the web to form segments, where a first segment includes documents printed in a 2-up format. The post-print system also includes a 2-up handler configured to receive the first segment. The post-print system is configured to read an instruction printed on the first segment that includes handling information for the documents printed on the first segment, and to process the documents printed on the first segment based on the handling information.

Another embodiment is a method that includes printing an N-up print job onto a web of media where N is at least three. The method also includes cutting the web along a length of the web to form segments, where a first segment includes documents printed in a 2-up format. The method further includes receiving the first segment of the web at a 2-up handler of a post-print system, and reading an instruction printed on the first segment that includes handling information for the documents printed on the first segment. The method also includes processing, with the 2-up handler, the documents printed on the first segment in accordance with the handling information.

A further embodiment includes an apparatus that includes an ADF workflow application, a printer, and a post-print system. The ADF workflow application is configured to receive documents for printing a print job in an N-up format, and to arrange the documents into columns of the print job based on post-print information associated with the documents. The ADF workflow application is further configured to compile post-print information of documents within a column into an instruction specific to documents within the column, and to insert the instruction into the column of the print job for printing. The printer is configured to receive the print job, and to print the print job onto a web of media such that the columns of the print job collectively form the N-up format on the web. The post-print system is configured to receive the web, to cut the web along a length of the web for separation of the column, and to process documents printed in the column based on the instruction printed in the column.

Other exemplary embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
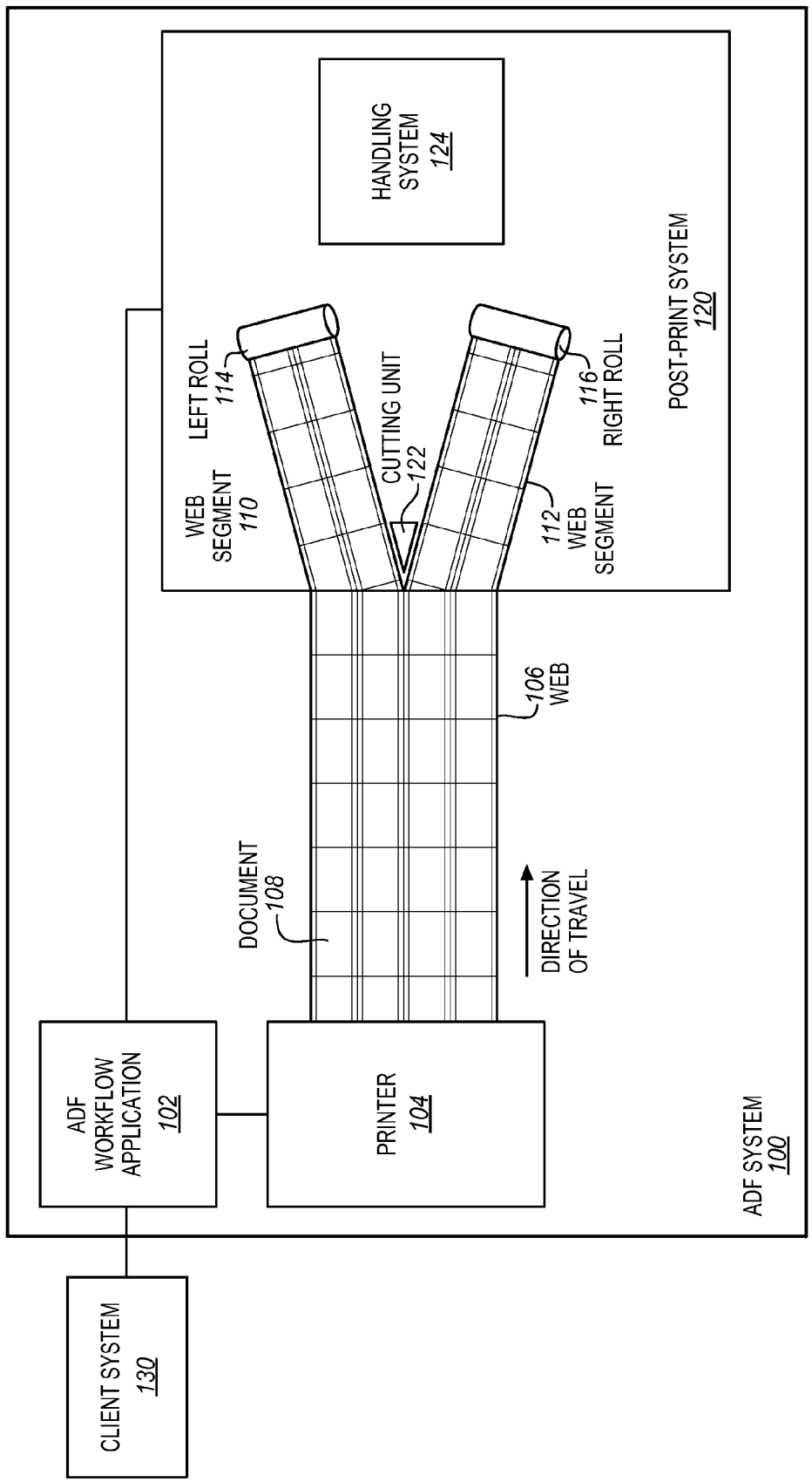
FIG. 1 is a block diagram of an ADF system in an exemplary embodiment.

FIG. 1 is a block diagram of an Automated Document Factory (ADF) system 100 in an exemplary embodiment. The ADF system 100 includes an ADF workflow application 102 configured to manage print jobs within a production printing environment. The ADF workflow application 102 receives print jobs from a client system 130 and processes the print jobs for N-up printing with a printer 104 in the ADF system 100. N-up refers to a printing format where a number N of individual documents (e.g., document 108) are positioned in a parallel plane across a width of one side of a web 106 of media (i.e., orthogonal to the direction of travel of the web 106 shown in FIG. 1). In this embodiment, the printer 104 is configured to receive a 4-up print job and print the documents of the print job onto the web 106 with documents printed in a 4-up format. However, those of ordinary skill in the art would recognize that alternative N-up printing configurations other than that shown in FIG. 1 are possible.

The ADF system 100 also includes a post-print system 120 configured to process documents printed on a web in accordance with handling information. The post-print system 120 includes a handling system 124 that may comprise any number of post-print devices for processing the documents printed on a web, such as a cutter, folder, inserter, stacker, binder, mailer, etc. The handling system 124 processes printed documents by correlating the printed documents with machine-readable markings on the web 106 that include handling information (e.g., post-print instructions) for processing the documents. The machine-readable markings may be calculated by the ADF workflow application 102 and inserted into a print job for printing along with the other documents in the print job.

Previous ADF systems print webs in a 1-up or 2-up format so that downstream post-print devices, which are typically capable of handling no more than a 2-up web format, are consistent and compatible with the printers in the ADF system. 2-up post-print devices are not installed alongside 3-up or 4-up printers because current protocols are unable to counterbalance different levels of N-up devices within the same ADF system. In other words, a print job configured for 3-up or 4-up printing cannot be received/processed by a 2-up handling system. Post-print processing for 3-up and 4-up printing have to this point been limited to combinations of 1-up and manual handling of documents.

The ADF system 100 of FIG. 1 therefore includes an ADF workflow application 102 configured to prepare print data so that it can be deciphered by both a 4-up printer and a 2-up post-print handling system (e.g., handling system 124). The ADF workflow application 102 organizes documents within a 4-up print job into a left 2-up column and a right 2-up column and inserts handling information in each column of the 4-up print job that enables the column to be interpreted as an independent 2-up job for post-print handling. The post-print system 120 includes a cutting unit 122 to physically separate the columns into web segments 110/112 and may further include a left roll 114 and a right roll 116 for collection of the respective web segments 110/112. The post-print system 120 may therefore insert the left roll 114 or the right roll 116 (either manually or automatically) into the handling system 124 for independent 2-up post-print processing of documents. Thus, the ADF system 100 is configured to coordinate an N-up print job for printing and handling with different levels of N-up devices.

It will be appreciated that while specific N-up configurations are shown and described in FIG. 1 and in embodiments that follow, such embodiments are merely exemplary and provided for the sake of brevity and clarity. For instance, the printer 104 of the ADF system 100 may, in some embodiments, be capable of 3-up printing and the post-print system 120 configured to cut a web 106 formatted in a 3-up format to create a web segment in a 2-up format and a web segment in a 1-up format, which are subsequently handled independently by the post-print system 120. Those skilled in the art would recognize that numerous combinations of N-up printing (e.g., N is 3 or more) and N-up handling (e.g., N is 2 or more) are possible without departing from the scope of the embodiments described herein. The ADF system 100 may also include additional N-up and/or non-N-up printing and handling devices.

Figure 2:
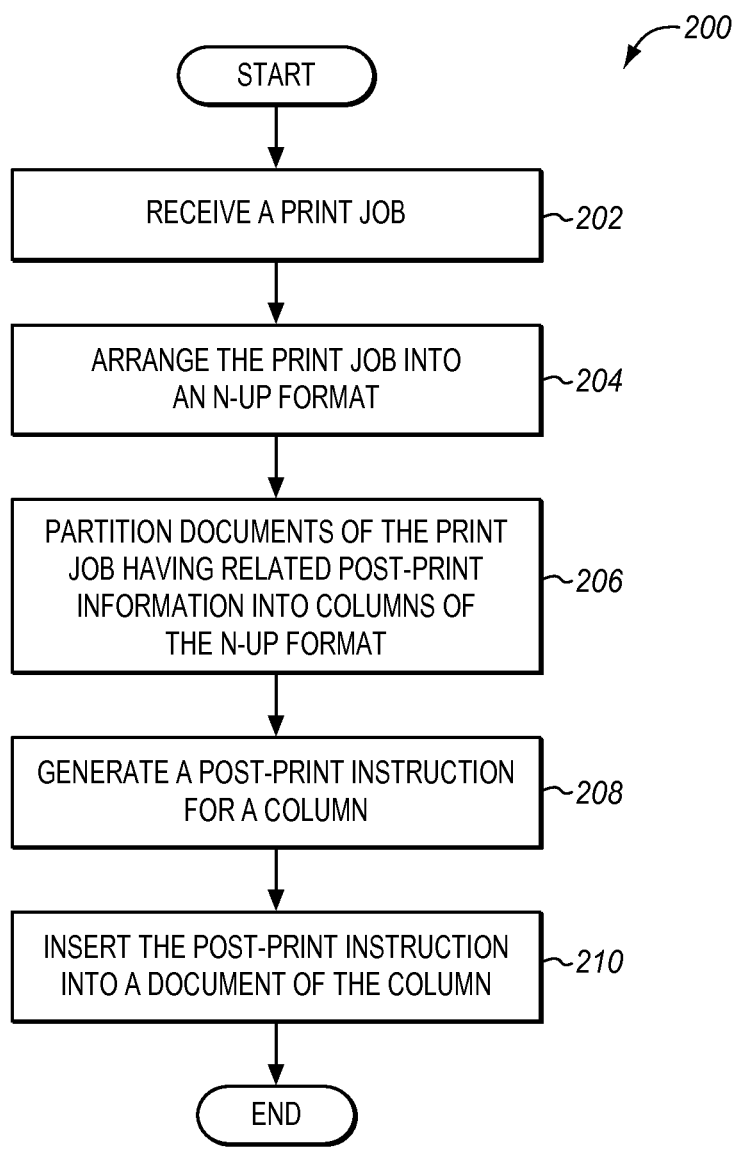
FIG. 2 is a flowchart illustrating a method for organizing a 4-up print job such that printed documents may later be handled with 2-up post-print equipment in an exemplary embodiment.

FIG. 2 is a flowchart illustrating a method for organizing a 4-up print job such that printed documents may later be handled with 2-up post-print equipment in an exemplary embodiment. The steps of methods herein will be described with reference to printing system 100 of FIG. 1, but those skilled in the art will appreciate that method 200/300 may be performed in other systems. The steps of the flowchart(s) described herein are not all inclusive and may include other steps not shown. The steps described herein may also be performed in an alternative order.

In step 202, the ADF workflow application 102 receives a print job. The ADF workflow application 102 may receive a 4-up print job or print jobs received in a different N-up format (e.g., 1-up, 2-up, etc.) may be assembled into a 4-up print job. In step 204, the ADF workflow application 102 arranges one or more print jobs into a 4-up format. In step 206, the ADF workflow application 102 partitions documents of the print job into columns of the 4-up format. A column of the print job is, in one embodiment, a logical partition within the print job that runs along a length of the web to be printed. A column within a print job may include one document across its width, two documents across its width, or more. For instance, the ADF workflow application 102 may determine a group of documents that share similar post-print instructions indicated by a client, such as sorting information, inserting information, binding information, mailing information, etc., and form a column of the grouped documents within a print job that is two documents side by side for the length of the column (i.e., length of the web to be printed).

In step 208, the ADF workflow application 102 generates a post-print instruction that describes the collective post-print information for documents in that column. In step 210, the ADF workflow application 102 inserts the post-print instruction into a document of the column for printing. In one embodiment, the ADF workflow application 102 forms the instruction into a machine readable marking decipherable by a post-print device such as the handling system 124. As such, though the documents are collectively organized into a 4-up print job, columns within the print job are independently decipherable by post-print equipment configured to handle jobs that are less than 4-up. Those of ordinary skill in the art will recognize that N-up formats other than 4-up are possible, as the 4-up format in FIG. 2 is merely exemplary and provided for the sake of clarity.

Figure 3:
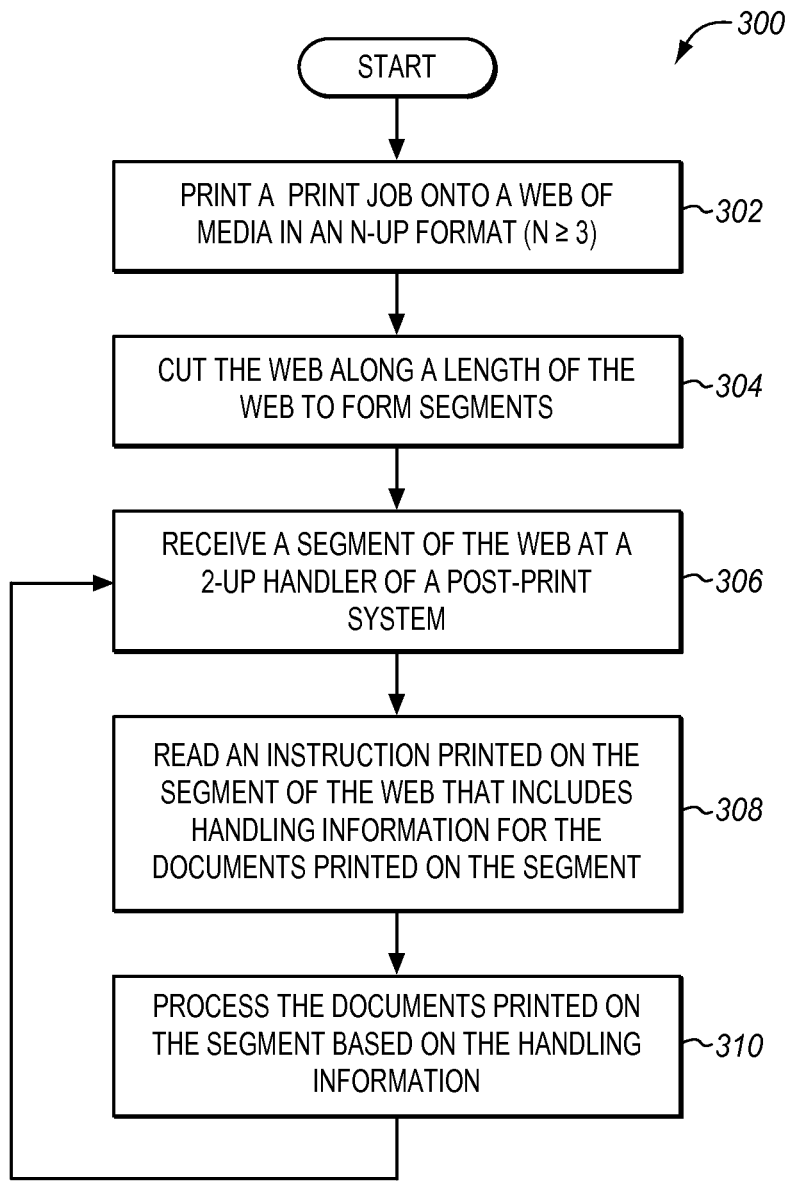
FIG. 3 is a flowchart illustrating a method for handling a 4-up web in an ADF system with 2-up post-print equipment in an exemplary embodiment.

FIG. 3 is a flowchart illustrating a method for handling a 4-up web in an ADF system with 2-up post-print equipment in an exemplary embodiment. In step 302, the printer 104 prints a 4-up print job onto a web 106 of media. The printer 104 in some embodiments comprises a high-volume N-up printer configured to receive and process N-up print jobs from the ADF workflow application 102, where N may be three, four, five, or more as a matter of design choice. Print jobs may encompass a variety of print formats, such as Advanced Function Printing (AFP), Portable Document Format (PDF), Page Description Language (PDL), or others. In one embodiment, the web 106 is thirty inches across its width or more.

In step 304, the cutting unit 122 of the post-print system 120 cuts the web 106 along a length (i.e., parallel to the direction of travel of the web 106 shown in FIG. 1) of the web 106 to create a plurality of web segments 110/112. At least one of the web segments 110/112 includes documents printed in a 2-up format. For example, the web 106 may include documents printed in a 4-up format and the cutting unit may be positioned to cut the web 106 down the middle, thus forming two resultant web segments 110/112, each in a 2-up format. However, the cutting unit 122 may be positioned to cut the web 106 at alternative or additional locations (e.g., multiple cutting units) and the web segments 110/112 may comprise any N-up format that is manageable by downstream N-up post-print devices included in the handling system 124.

In step 306, the handling system 124 of the post-print system 120 receives a segment of the cut web (e.g., web segment 110, web segment 112, or both). The post-print system 120 may include one or more rolls 114/116 to collect the one or more web segments 110/112. In one embodiment, a left roll 114 rotates to gather the web segment 110 as the web 106 is cut, and a right roll 116 does the same for the web segment 112. The post-print system 120 may additionally be configured to cut the web 106 across the width when the last document or row of documents in the N-up print job is received at the post-print system.

In step 308, the post-print system 120 reads an instruction printed on a web segment (e.g., web segment 110 or web segment 112) that includes handling information for the documents printed on that web segment. The instruction may be comprised of machine-readable code calculated and inserted into the N-up print job by the ADF workflow application 102 and printed along with other documents in the N-up print job by the printer 104. Then, in step 310, the post-print system 120 processes the documents printed on the segment (e.g., web segment 110 or web segment 112) in accordance with the handling information printed on that web segment. Additional web segments may be subsequently or simultaneously received at a handler of the post-print system for processing documents included therein in a similar yet separate manner.

As an example, handling information for the web segment 110 may be read by the post-print system 120 as a printed item included in the web segment 110. Then, the post-print system 120 may dispatch the left roll 114 (which has collected the web segment 110) as an independent 2-up print job to a handling system configured for 2-up handling (e.g., handling system 124). The ADF system 100 thus, in this embodiment, receives the cost-saving advantages of printing a 4-up print job and retains the efficiency of 2-up handling within the same system.

Examples

Figure 4:
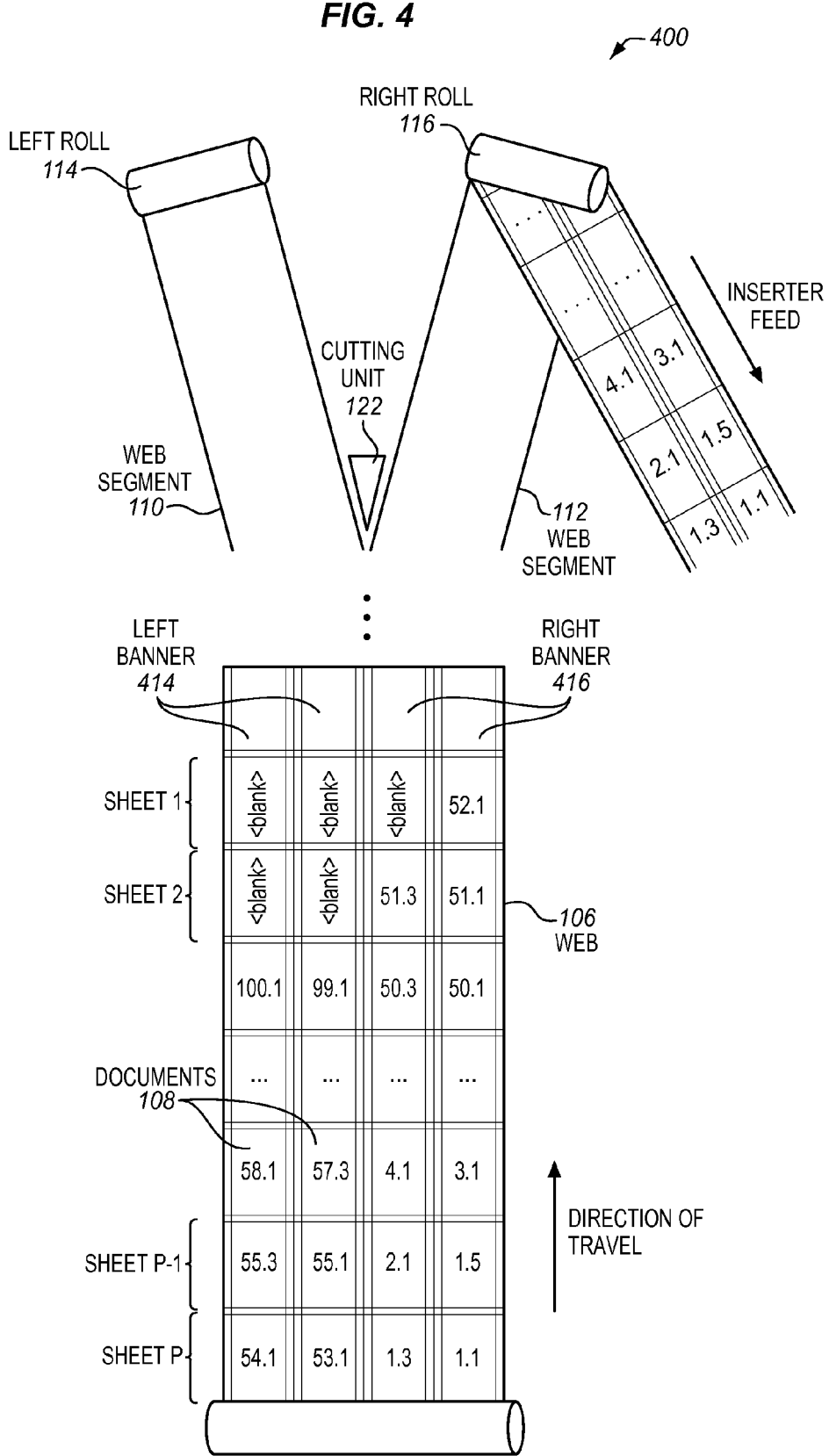
FIG. 4 is a block diagram of a printed 4-up print job prepared for 2-up handling in an exemplary embodiment.

FIG. 4 is a block diagram of a printed 4-up print job prepared for 2-up handling in an exemplary embodiment. Assume, for the sake of this embodiment, that the printer 104 has printed a 4-up print job onto the web 106 in accordance with information sent by the ADF workflow application 102. In some embodiments, a workflow application combines and processes a plurality of print jobs received from the client system 130 into a single N-up print job based on a threshold number of documents in the plurality of print jobs. For instance, when a document threshold is not met, documents received from the client system 130 may be commingled into a 2-up print job, and when the document threshold is met documents may be commingled into a 4-up print job. Additionally, the ADF workflow application 102 may receive, either manually or from other devices in the ADF system 100, information regarding lost, damaged, or erroneously printed documents and reprocess such documents into another N-up print job.

With the document threshold met, the ADF workflow application 102 logically assigns a new 4-up print job and calculates a split in the print job. In doing so, the ADF workflow application 102 groups individual documents 108 according to the document owner and/or other metrics associated with each document 108. For instance, the ADF workflow application 102 may determine post-print information and/or mailing information for each document 108 and organize documents having similar post-print instructions into the same group. The split calculation thus ensures a level of continuity in the documents for efficient downstream post-print processing, and in some instances may qualify the documents for USPS discounts under the Postal Accuracy Validation and Evaluation (PAVE) certification. In one embodiment, the ADF workflow application 102 is configured for post processor file-based adjustments. For instance, a Mail Run Data File (MRDF) may be split to match with the calculated split of the documents so that a downstream inserter is able to reconcile inserted documents.

In this embodiment, the ADF workflow application 102 has organized the documents into a 4-up print job in the format eventually printed onto the web 106 in FIG. 4. The documents of FIG. 4 are labelled by an owner number followed by the page number. For instance, document 1.1 is page one from owner one, document 1.3 is page three from owner one, and so on. In this instance, as a result of the split calculation, the documents of owners one through fifty two are grouped in the 4-up print job for printing on the right side of the web 106, referred to herein as the right group. And, the documents of owners fifty three through one hundred are grouped in the 4-up print job for printing on the left side of the web 106, referred to herein as the left group.

The ADF workflow application 102 may insert blank documents into the 4-up print job to ensure uniformity among sheets in the N-up print job and/or to ensure a 2-up (or other N-up) configuration throughout a length of group. In the example of FIG. 4, the print job includes P sheets and each sheet includes four documents in accordance with the 4-up print job. The ADF workflow application 102 has inserted one blank document into the right group of the 4-up print job to arrange a 2-up format of documents for the right group. Additionally, the ADF workflow application 102 has inserted four blank documents into the left group of the N-up print job to match the number of documents in the left group with the number of documents in the right group.

The ADF workflow application 102 is further configured to calculate a banner for each group that describes handling information for documents included within that group. As shown in FIG. 4, the ADF workflow application 102 in this example has calculated a right banner 416 for the right group and inserted the right banner 416 in the right group for printing, and calculated/inserted a left banner 414 for printing with the left group. The right banner 416 includes handling information (i.e., post-print instructions for the handling system 124) for the documents of owners one through fifty two in the form of a machine readable code. Similarly, the left banner 414 includes handling information for the documents of owners fifty three through one hundred in the form of machine readable code. A banner may include handling information for multiple columns of printed documents on the web 106, or alternatively, a banner may be calculated and printed for a single column of documents on the web 106.

In one embodiment, the ADF workflow application 102 adds the banners 414/416 to the print file as separate documents in the same print job format (e.g., AFP). Though shown in FIG. 4 as inserted in the 4-up print job for printing on the front end of the web 106, the banners 414/416 may be additionally or alternatively be inserted in the 4-up print job for printing on the tail end of the web 106 or somewhere between the front end and the tail end of the web 106. The operator of the ADF workflow application 102 may, at some point, elect to reformat the 4-up print job and cause the ADF workflow application 102 to store the information that describes the creation of the 4-up print job up to that point as a check point. The ADF workflow application 102 may subsequently reformat the documents into a different print job format. For instance, an operator may elect to format a print job in a "roll to roll" format wherein documents and banner pages are prepared/printed in a reverse manner and re-rolled after printing so that the documents may be fed in order to a handling system 124. Alternatively, an operator may elect to format a print job in a stack/fold format wherein documents and banner pages are prepared, printed, and handled in the same order in the workflow.

After the ADF workflow application 102 sends the 4-up print job to the printer 104 and the printer 104 prints the 4-up print job onto the web 106, the cutting unit 122 splits the web into two segments. The left roll 114 collects the web segment 110 which includes the left group and the left banner 414 that describes handling information for the left group. The right roll 116 collects the web segment 112 that includes the right group and the right banner 416 which describes handling information for the right group.

The post-print system 120 may dispatch the left roll 114 and/or the right roll 116 separately to the handling system 124 as individual jobs. For instance, the handling system 124 may comprise a 2-up inserter that receives the unfurled documents of the right group and processes the documents of owners one through fifty two as a separate job in accordance with the handling information included in the right banner 416. The handling information may be deciphered by the post-print system 120 and sent to the handling system 124 and/or read and processed by the handling system 124 itself. Although the print job and the web 106 are described in a 4-up context and the web segment(s) 110/112, left group, right group, and the handling system 124 are described in a 2-up context in FIG. 4, those of ordinary skill in the art will recognize that alternative N-up configurations and combinations are possible.

Figure 5:
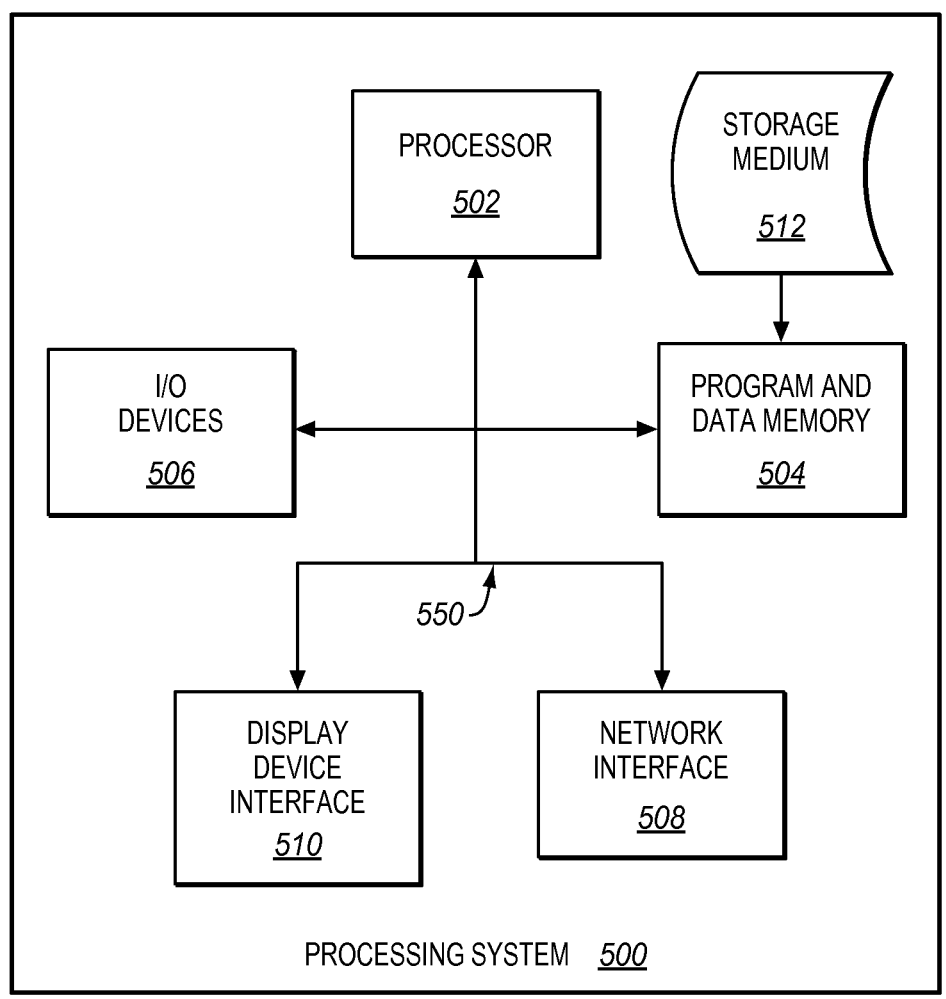
FIG. 5 illustrates a processing system operable to execute a computer readable medium embodying programmed instructions to perform desired functions in an exemplary embodiment.

Embodiments disclosed herein can take the form of software, hardware, firmware, or various combinations thereof. In one particular embodiment, software is used to direct a processing system of the ADF workflow application 102 and/or post-print system 120 to perform the various operations disclosed herein. FIG. 5 illustrates a processing system 500 configured to execute a computer readable medium embodying programmed instructions to perform desired functions in an exemplary embodiment. Processing system 500 is configured to perform the above operations by executing programmed instructions tangibly embodied on computer readable storage medium 512. In this regard, embodiments of the invention can take the form of a computer program accessible via computer-readable medium 512 providing program code for use by a computer or any other instruction execution system. For the purposes of this description, computer readable storage medium 512 can be anything that can contain or store the program for use by the computer.

Computer readable storage medium 512 can be an electronic, magnetic, optical, electromagnetic, infrared, or semiconductor device. Examples of computer readable storage medium 512 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 500, being suitable for storing and/or executing the program code, includes at least one processor 502 coupled to program and data memory 504 through a system bus 550. Program and data memory 504 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 506 (including but not limited to keyboards, displays, pointing devices, etc.) can be coupled either directly or through intervening I/O controllers. Network adapter interfaces 508 may also be integrated with the system to enable processing system 500 to become coupled to other data processing systems or storage devices through intervening private or public networks. Modems, cable modems, SCSI, Fibre Channel, and Ethernet cards are just a few of the currently available types of network or host interface adapters. Presentation device interface 510 may be integrated with the system to interface to one or more presentation devices, such as printing systems and displays for presentation of presentation data generated by processor 502.

Although specific embodiments were described herein, the scope of the invention is not limited to those specific embodiments. The scope of the invention is defined by the following claims and any equivalents thereof.

We claim:

1. An apparatus comprising:
a post-print system configured to receive a web of media printed in an N-up format, wherein N is at least three;
the post-print system includes a cutting unit configured to cut the web along a length of the web to form segments, wherein a first segment includes documents printed in a 2-up format; and
the post-print system includes a 2-up handler configured to receive the first segment, to read an instruction printed on the first segment that includes handling information for the documents printed on the first segment, and to process the documents printed on the first segment based on the handling information.

2. The apparatus of claim 1 wherein:
the 2-up handler is configured to receive a second segment of the web, to read an instruction printed on the second segment that includes separate handling information for documents printed on the second segment, and to process the documents printed on the second segment based on the separate handling information.

3. The apparatus of claim 1 further comprising:
an ADF workflow application configured to receive a print job, to arrange the print job into the N-up format, to partition documents of the print job having related post-print information into a first column of the N-up format, to generate a post-print instruction for the first column, and to insert the post-print instruction into a document of the first column.

4. The apparatus of claim 3 wherein:
the web of media is in a 4-up format; and
the column is a 2-up partition.

5. The apparatus of claim 1 wherein:

the instruction is a machine-readable marking printed on the first segment that instructs the post-print system to process the first segment as an independent job in a 2-up format.

6. The apparatus of claim 1 wherein:

the N-up print job is in an Advanced Function Printing (AFP) format.

7. A method comprising:

printing an N-up print job onto a web of media, wherein N is at least three;

cutting the web along a length of the web to form segments, wherein a first segment includes documents printed in a 2-up format;

receiving the first segment of the web at a 2-up handler of a post-print system;

reading an instruction printed on the first segment that includes handling information for the documents printed on the first segment; and processing, with the 2-up handler, the documents printed on the first segment in accordance with the handling information.

8. The method of claim 7 comprising:

receiving a second segment of the web;

reading an instruction printed on the second segment that includes separate handling information for documents printed on the second segment; and processing the documents printed on the second segment based on the separate handling information.

9. The method of claim 7 comprising:

partitioning documents of the N-up print job having related post-print information into a first column of the N-up format;

generating a post-print instruction for the first column; and inserting the post-print instruction into a document of the first column.

10. The method of claim 9 wherein:

the web of media is in a 4-up format; and the column is a 2-up partition.

11. The method of claim 7 wherein:

the instruction is a machine-readable marking printed on the first segment that instructs the post-print system to process the first segment as an independent job in a 2-up format.

12. The method of claim 7 wherein:

the N-up print job is in an Advanced Function Printing (AFP) format.

13. An apparatus comprising:

an ADF workflow application configured to receive a print job, to arrange the print job into an N-up format, to partition documents of the print job having related post-print information into a first column of the N-up format, to generate a post-print instruction for the first column, and to insert the post-print instruction into a document of the first column;

a printer configured to receive the print job, and to print the print job onto a web of media; and a post-print system configured to receive the web, to cut the web along a length of the web for separation of the first column, and to process documents printed in the first column based on the post-print instruction printed in the first column.

14. The apparatus of claim 13 wherein:

the ADF workflow application further configured to generate a different post-print instruction for documents in a second column of the N-up format, and to insert the different post-print instruction into a document for the second column; and the post-print system is further configured to separate the second column from the web, and to process documents printed in the second column based on the different post-print instruction printed in the second column.

15. The apparatus of claim 13 wherein:

N is at least three; and the documents printed in the column are in a 2-up format.

16. The apparatus of claim 13 wherein:

the instruction is a machine-readable marking printed in the column.

17. The apparatus of claim 13 wherein:

the N-up print job is in an Advanced Function Printing (AFP) format.

\* \* \* \* \*